US006343465B1

(12) United States Patent
Martinov

(10) Patent No.: US 6,343,465 B1
(45) Date of Patent: Feb. 5, 2002

(54) AIRCRAFT FUEL TANK EXPLOSION REDUCTION SAFETY METHOD

(76) Inventor: Norman P. Martinov, 4744 Del Morano Dr., Woodland Hills, CA (US) 91364

( * ) Notice: Subject to any disclaimer, the term of this patent is extended or adjusted under 35 U.S.C. 154(b) by 0 days.

(21) Appl. No.: 09/433,199

(22) Filed: Nov. 3, 1999

Related U.S. Application Data

(60) Provisional application No. 60/141,181, filed on Jun. 25, 1999.

(51) Int. Cl.[7] ............................. F02C 7/18; F02C 7/72; F02C 7/232
(52) U.S. Cl. ..................... 60/204; 60/39.094; 60/39.07; 60/39.83; 244/135 R
(58) Field of Search ........................ 60/39.091, 39.094, 60/39.07, 39.83, 39.02; 244/135 R

(56) References Cited

U.S. PATENT DOCUMENTS

| | | | | |
|---|---|---|---|---|
| 2,404,418 A | * | 7/1946 | Walker | 244/135 R |
| 2,586,839 A | * | 2/1952 | Mapes | 60/39.094 |
| 2,671,314 A | * | 3/1954 | Lichty | 60/39.02 |
| 2,711,842 A | * | 6/1955 | Jonas | 244/135 R |
| 2,757,362 A | * | 7/1956 | Gutkowski | 244/135 R |
| 2,884,948 A | * | 5/1959 | Weiss | 60/39.091 |
| 2,889,955 A | * | 6/1959 | Naulty et al. | 244/135 |
| 3,080,716 A | * | 3/1963 | Cummings et al. | 60/39.83 |
| 3,229,446 A | * | 1/1966 | Sebastian et al. | 60/39.094 |
| 3,309,866 A | * | 3/1967 | Kydd | 60/39.02 |
| 3,556,444 A | * | 1/1971 | Kapp | 60/39.094 |
| 3,788,039 A | * | 1/1974 | Bragg | 244/135 R |
| 3,841,089 A | * | 10/1974 | Clark | 60/39.094 |
| 3,948,626 A | * | 4/1976 | Bragg | 55/160 |
| H1159 H | * | 4/1993 | Roach | 417/151 |
| 6,045,088 A | * | 4/2000 | Saiz | 60/39.07 |

* cited by examiner

Primary Examiner—Ted Kim

(57) ABSTRACT

An efficient, economical, reliable method for reducing aircraft fuel tank explosion potential that can easily be manufactured or retrofitted to existing aircraft systems. Ducting means to connect an aircraft's propulsion or auxiliary power gas turbine jet engine air intake suction area to the aircraft's fuel tank ullage area to effect continuous or selective suction operation for removal of potentially explosive fuel fume-vapors and replacement of the fume-vapors with outside or temperature controlled outside air with lower-oxygen content air or inert substances to reduce fuel tank explosive and flammability potential. Similarly, ducting is provided from engine intake suction area to areas around the exterior of the fuel tank to suction excessive heat away from the tank and replace it with cooler outside air, mechanically conditioned air or cabin/flightdeck air to reduce the explosive and flammability potential.

3 Claims, 2 Drawing Sheets

AIRCRAFT FUEL TANK EXPLOSION REDUCTION SAFETY METHOD

CROSS-REFERENCE TO RELATED APPLICATIONS

This application is entitled to the benefit of Provisional Patent Application Serial No. 60/141,181 filed Jun. 25, 1999.

BACKGROUND-STATEMENT REGARDING FEDERALLY SPONSORED RESEARCH DEVEL.

Not Applicable

BACKGROUND-FIELD OF INVENTION

This invention relates to aircraft safety improvements, specifically an efficient, economical method of using an aircraft's propulsion or auxiliary Power engines, for new purposes of removing fuel tank fume-vapors and control of fuel tank temperature to reduce the potential of explosion and flammability there-in.

BACKGROUND-DESCRIPTION OF PRIOR ART

Past and present day engineering design in commercial and corporate-business a aircraft to remove explosion potential in fuel tanks has been to design out all energy sources which could ignite the explosive fumes there-in. The history of aircraft fuel tank explosions and especially the tragic results of the recent T.W.A. Flight 800 explosion and crash show that designing out all possible energy sources is impossible. Furthermore, even if it were possible to remove all on-board energy sources it would be impossible to remove external energy sources such as bullets, missiles, meteors and lightning strikes. Some solutions other than designing out energy sources have been proposed. One current proposal is to purge fuel tank ullage areas of dangerous explosive fume-vapors by ram air methods. Problems with ram air purge methods would be creation of aerodynamic drag penalties but more importantly they would deposit unburned hydrocarbons into the atmosphere. Another method proposes cooling the fuel tank ullage area to reduce flammability potential by introducing ram air past the fuel tank. Again, aerodynamic drag penalties occur with possible static electricity build-up problems of its own. A further problem with ram air purge methods is they can only operate when the aircraft is in motion and not at a standstill such as waiting on the tarmac for flight instructions. Another method proposal is to reduce the fuel tank ullage area and consequently the fume-vapor build-up by always carrying a minimum amount of fuel in the tank. Problems associated with this method are the continual weight penalties and operational constraints including the inability to always maintain the minimum amount of fuel in the tank. A final proposal to reduce fuel tank flammability is to cool fuel tanks by using colder fuel or fuel stored in underground tanks. Again, the main drawback is the operational constraint to maintain the fuel temperature after fueling.

Past and present day military solutions for the prevention of fuel tank explosions is to introduce inerting gases into the fuel tank ullage area so that dangerous fume-vapors will not accumulate there-in. The well known drawbacks to these systems are massive weight penalties and maintenance nightmares including the high cost and complexity of these systems. Historically the operation of these systems have created some safety problems of there own. Also, the displaced unburned hydrocarbons caused by these methods create atmospheric pollution. A current fuel tank inerting method proposes utilization of engine exhaust as an inerting gas. Problems associated with this method include the cost and weight of the system needed to treat and introduce exhaust gases to the fuel tank and the inherent corrosiveness of the exhaust products.

SUMMARY

In accordance with the broad aspects of the invention, an aircraft safety system includes an inexpensive, simple, efficient and effective method for purging and removing explosive and flammable fuel fumes and heat from the aircraft's a fuel tank and fuel tank compartment areas using the aircraft's operating dedicated propulsive or auxiliary power engines' low pressure suction intake action for a new use of purging aircraft fuel tank areas and as the driving method to remove fuel flames and heat to reduce explosive and flammability potential while replacing fumes and beat with outside ambient air mechanically refrigerated air or aircraft cabin-cockpit outflow air.

More specifically, ducting or conduit is provided, one end of which is in communication with the aircraft's fuel tank ullage area or fuel tank compartment, and the other end of the duct is coupled to the engine air intake area so that the operating engine's intake suction force is used to drive the system of purging and removing dangerous fumes and heat from the fuel tank areas and conducting them into the engine's combustion, chamber areas for combustion and exhaust. Additionally the removed fume and heat is replaced by ambient outside air, mechanically refrigerated air or cabin-cockpit overflow air through the tank or tank compartment intake valves.

In operation, this method of fume-heat removal method can be implemented by manual or automatic control servo-mechanism after the engine selected for this method is started and operating. The fumes and heat from fuel tank ullage or fuel tank compartment will exit the tank or tank compartment outflow-valve and be conducted via the duct or conduit from the higher pressure tank or tank compartment into the lower pressure engine's combustion area for combustion and exhaust to the atmosphere. Concurrently, outside air will enter into the tank or tank compartment inflow valve as the fume and, heat re-placement medium if the outside ambient air temperature is below a predetermined set temperature, if outside air temperature is above this preset temperature the replacement medium will be mechanically refrigerated air provided by the aircraft's mechanical equipment or cabin-cockpit conditioned outflow air. It should be obvious that while the aircraft is in flight or at altitude the majority of replacement air will be the outside ambient air however, while on the runway or tarmac waiting for take-off with a relatively high outside-temperature the replacement air may well be the aircraft's refrigerated air or cabin-cockpit outflow air.

Obvious advantages of this method of purging and removing dangerous fumes and heat by this method is that it is easy and inexpensive to implement as new manufacture or retrofit existing aircraft and due to it's simplicity, the system is highly reliable with relatively little added weight penalty and few maintenance problems. Furthermore, it is an added explosive deterrent against any errant energy source and can be used supplementary to any existing or future method or apparatus for this purpose as an added insurance. Additionally a major advantage of this method over proposed ram air methods for the same purposes is that this method can be used at a standstill while on the tarmac or runway and even while refueling the aircraft while ram air methods require forward motion to operate and when so doing, pollute the atmosphere with unburned hydrocarbons while this method combusts the unburned hydrocarbons before they are vented to the atmosphere. In this regard, the method has produced two unanticipated advantages which are, increased engine efficiency due to engine intake of unburned fumes and a decrease in the pollution of the atmosphere by unburned hydrocarbons due to their combustion before being vented to the atmosphere.

OBJECTS AND ADVANTAGES

Accordingly several objects and advantages of the present invention are:

(a) to provide the simplest and most efficient, economical, safest reliable method of removing aircraft fuel tank fume-vapors and maintaining tank temperature to reduce explosive amid flammability potential there-in;

(b) to provide a method to reduce an aircraft's fuel tank, explosive potential that can be easily and inexpensively retrofitted to existing aircraft systems;

(c) to increase the aircraft's- engine efficiency by enriching engine combustion intake air-with fuel fume-vapors;

(d) to combust unburned hydrocarbons that were previously vented to the atmosphere;

(e) to cool fuel tank ullage areas by drawing cooler ambient outside air into the fuel tank while removing fuel fume-vapors;

(f) to draw fume-vapors from the aircraft's fuel tank and replace them with mechanically temperature conditioned outside air;

(g) to draw fume-vapors from fuel tanks-connected in series from coolest to hottest tanks;

(h) to draw fume-vapors from cooler upstream wing tanks to warmer downstream central tanks before removal by engine suction;

(i) that fumes be suctioned continuously while engine is operational (j) that fumes be selectively suctioned by manually controlled servo-mechanism valve;

(k) that fumes be suctioned by automatic control valve;

(l) that fumes be suctioned by thermostatic control valve;

(m) that fume suction be controlled by thermostat located in the fuel tank;

(n) to replace suctioned fumes with a higher altitude lower oxygen content air;

(o) to replace suctioned fumes with a higher altitude cooler air, mechanically conditioned air or cabin/flightdeck outflow air;

(p) that the aircraft's propulsion engine be used as a combination propulsion and fume removal engine;

(q) that the aircraft's propulsion engine be used for a new purpose of fuel tank fume remover;

(r) that the aircraft's auxiliary power engine be used as a combination auxiliary power and fume removal engine;

(s) that the aircraft's auxiliary power engine be used for a new purpose of fuel tank fume remover;

(t) that an aircraft's internal combustion engine be used as a combination propulsion and fume removal engine;

(u) to use engine suction and ducting means to remove hot air from outside the fuel tank and replace it with cooler air;

(v) that the aircraft's internal combustion engine be used for a new purpose of fuel tank fume remover;

(w) to use this method of fuel tank inerting in conjunction with existing or future methods of fuel tank inerting;

(x) to use substances other than outside air to replace fuel tank fume-vapors.

(y) to purge and remove fumes and heat from the fuel tank and fuel tank compartment while at a standstill and without movement.

It should be noted this method-process-system of reducing or eliminating flammability or explosion potential in an aircraft's fuel tank(s) is economical for new manufacture, easy to retrofit existing systems, very efficent and can also be used in addition to all other systems for the same purpose. These and other objects and advantages will become readily apparent from the application specification and the following descriptive drawings here-in-below in which:

BRIEF DESCRIPTION OF THE DRAWINGS

FIG. 1 is a cut-a-way drawing of an aircraft showing component parts for the removal of fuel tank fumes and replacement of cooler air there-in.

FIG. 2 is a cut-a-way drawing of an aircraft showing component parts for the removal of hot air from the compartment surrounding the fuel tank area and replacement of cooler air there-in.

DETAILED DESCRIPTION OF THE DRAWINGS

Figure 1:
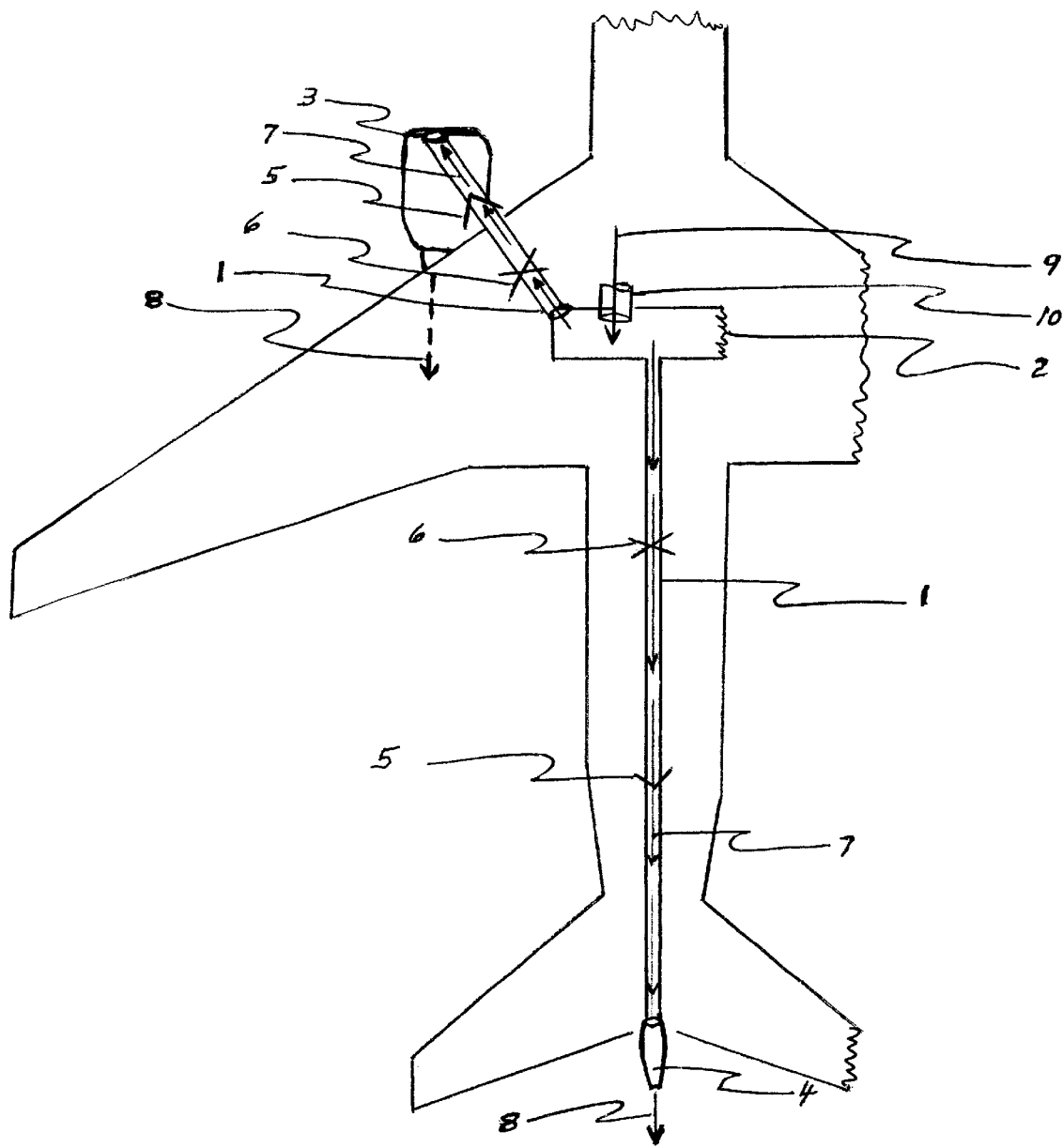

Referring now to FIG. 1, a conduit 1 connects fuel tank ullage area 2 to outside air intake areas of the aircraft's propulsive engine 3 and/or auxiliary power engine 4. The duct contains one-way airflow valves including spark/flame arrestor means 5 to prevent the possibility of any spark or flame from engines to the fuel tank. With engines running and opening activation of the servo-mechanism controlled valve 6 by manual, automatic (including thermostatic) controls, the fumes are suctioned and removed from the fuel tank ullage area. Fuel tank fumes 7 are suctioned into engine for combustion purposes with resulting burned hydrocarbon exhaust 8 into the atmosphere. Fuel tank ullage area(s) are replaced with cooler outside air, mechanically conditioned air including cockpit-flightdeck/cabin outflow air or upstream fuel tank ullage air 9 through fuel tank ullage inflow valve 10 to eliminate and/or reduce fuel tank's explosive and flammability potential.

Figure 2:
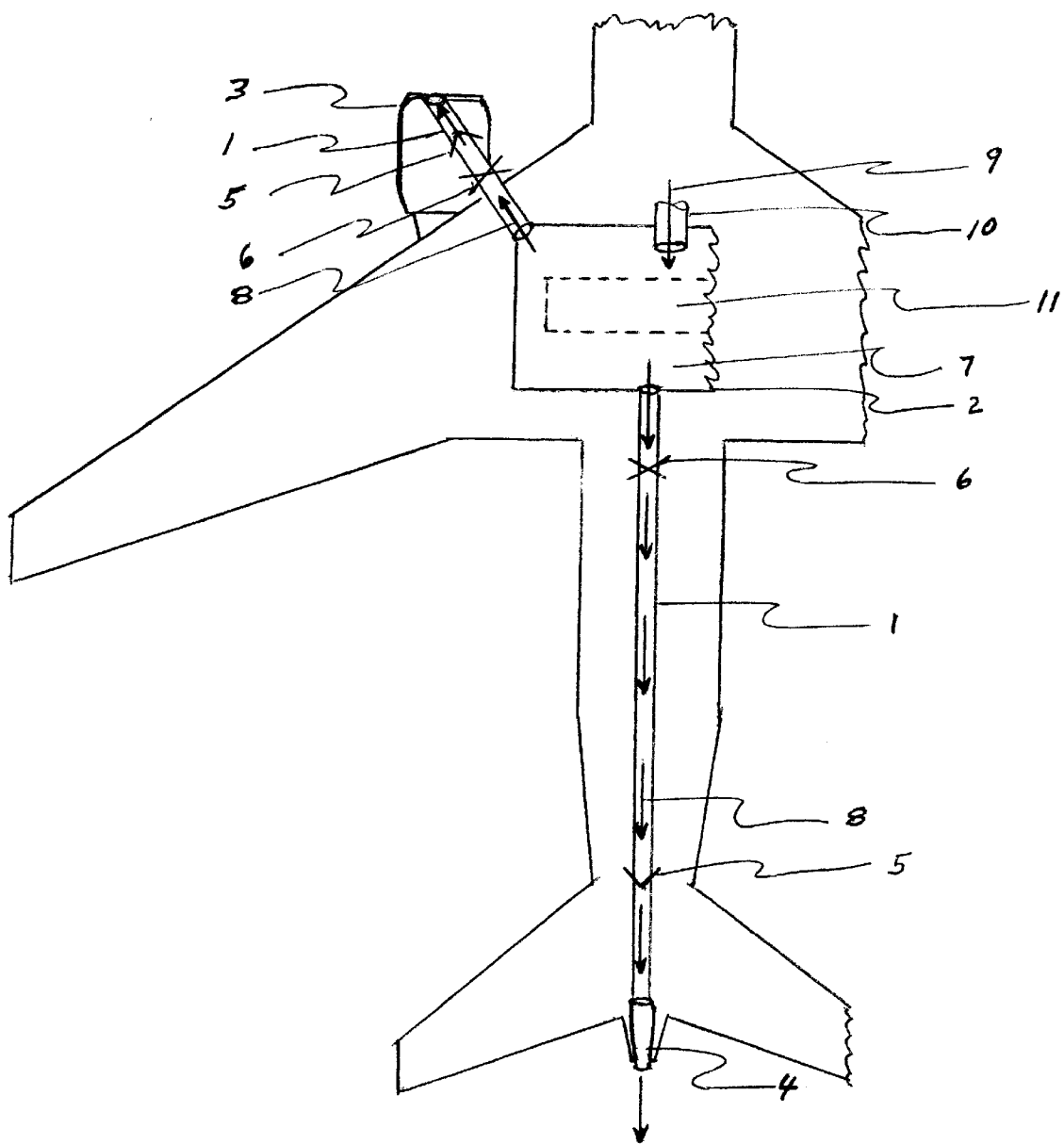

Referring now to FIG. 2, a conduit-duct 1 connects area surrounding fuel tank 2 to outside air intake areas of the aircraft's propulsive jet enging 3 and/or auxiliary power engine 4. The duct contains one-way air flow valves including spark/flame arrestor means 5 to prevent the possibility of any spark or flame from engines to the fuel tank area. With engine(s) running and opening activation of the servo-mechanism controlled valve 6 by manual, automatic (including thermostatic) controls, the hotter air is removed from area around the fuel tank 7. Hot air 8 is suctioned into engine to be used as outside combustion air. The area surrounding the fuel tank is then replaced with cooler outside air or mechanically conditioned air including cockpit-flightdeck/cabin outflow air 9 through fuel tank surrounding compartment inflow valve 10. Fuel tank 11 shown for approximate location (see FIG. 1 here-in-above for operation and description).

Note! While it appears the highest and best embodiment of the invention would be to use the auxiliary power engine to remove fuel tank fumes and the propulsive engine to remove hot air surrounding the fuel tank, either engine can be used for either purpose as described in FIG. A or FIG. B and can be used simultaneously or separately.

CONCLUSION, RAMIFICATIONS AND SCOPE

Other ramifications, scope and enlightenment can be found in the Provisional Patent Application and Disclosure Documents referenced in this application.

It should be obvious that this method is a simple, reliable and economical way to reduce the catastrophic potential of fuel tank explosion. It should also be observed that this method can easily be incorporated in new manufacture of aircraft and that it readily lends itself to modification and retrofitting of existing systems and can also be used in conjunction with other systems of aircraft fuel tank inertion.

In respect to the reduction of flammability by cooling the temperature of a fuel tank, it should be seen that this method accomplishes this objection quite nicely by replacing the removed fume-vapors with cooler ambient outside air especially at higher altitudes and also with mechanically conditioned air which can be called for by thermostatic control located in the fuel tank. It should also be noted that higher altitude air contains a lower oxygen content which further reduces its flammability potential.

Two secondary but important results of this invention are the efficiency improvements of the engine due to suctioning fuel-fume enriched air for combustion and the reduction of unburned hydrocarbons into the atmosphere.

An important aspect of this invention is the use of an aircraft's propulsive and/or auxiliary power engine as a combination, fuel tank fume-vapor remover because it obviates the cost of using a dedicated engine including its weight penalty.

Another important aspect of this invention is the use of engine suction and ducting means to remove heat from the areas outside the fuel tank and hot air in the vicinity of air conditioning equipment and to replace it with the cooler outside air or mechanically refrigerated air. It should be noted that the mechanically refrigerated air can be outflow air from the aircraft's pressurized cabin/flightdeck.

I claim:

1. A method for using an aircraft's dedicated propulsive or, auxiliary power engines for purging and removing dangerous fuel fumes and heat from within said aircraft's, fuel tank or fuel tank compartment areas with replacement of said fumes and heat by cooler, mechanically refrigerated air or cabin-cockpit outflow air comprising:

(a) a duct or conduit means interconnecting said aircraft's fuel tank ullage and fuel tank compartment areas and said aircraft's dedicated engine's outside air intake section for the transmission of said fuel fumes and hot air into said engine's combustion section when said engine is operating, (b) said fuel tank or fuel tank compartment areas containing an inflow valve means wherein mechanically refrigerated or cabin-cockpit outflow air can enter therein, (c) suctioning said dangerous and explosive fuel fumes and heat into said engine's outside air intake then into said combustion section for combustion and exhaust.

2. The method as defined in claim 1, wherein fuel tank or fuel tank compartment inflow valve means is ducted to aircraft's mechanically refrigerated air supply means.

3. The method as defined in claim 1 wherein fuel tank or fuel tank compartment inflow valve means is ducted to aircraft's cabin-cockpit conditioned air outflow valve means.

* * * * *